United States Patent [19]

Stadelmann

[11] 4,235,101
[45] Nov. 25, 1980

[54] ADJUSTABLE ENGINE CRANKSHAFT POSITION SENSOR WITH PREADVANCE TIMING SIGNAL CAPABILITY AND METHOD OF VARYING ENGINE TIMING

[75] Inventor: Joachim P. Stadelmann, Madison Heights, Mich.

[73] Assignee: The Bendix Corporation, Southfield, Mich.

[21] Appl. No.: 964,329

[22] Filed: Nov. 29, 1978

[51] Int. Cl.³ .......................................... G01M 15/00
[52] U.S. Cl. ..................................................... 73/116
[58] Field of Search .................... 73/117.3, 117.2, 116; 123/146.5 A; 200/25, 29, 31 R

[56] References Cited

U.S. PATENT DOCUMENTS

| | | | |
|---|---|---|---|
| 2,437,283 | 3/1948 | Viers | 116/124 |
| 2,520,071 | 8/1950 | Tennefos | 177/311 |
| 3,490,567 | 1/1970 | Clark et al. | 192/3 |
| 3,503,256 | 3/1970 | List et al. | 73/115 |
| 3,548,300 | 12/1970 | Nolting | 324/16 T UX |
| 3,562,741 | 2/1971 | McEroy et al. | 340/347 |
| 3,781,655 | 12/1973 | Lane | 324/16 T UX |
| 3,944,025 | 3/1976 | Owen | 184/3 R |
| 3,982,112 | 9/1976 | Schlereth | 235/156 |
| 3,999,383 | 12/1976 | Hanaoka | 60/277 |

Primary Examiner—Jerry W. Myracle
Attorney, Agent, or Firm—Markell Seitzman; Russel C. Wells

[57] ABSTRACT

A crankshaft position sensing system for sensing the motion of an engine crankshaft and a method of generating an output signal having an adjustable special phasing relationship with respect to the motion of a plurality of pistons disposed within the block of an automotive engine. The crankshaft position sensing system includes a pickoff disposed within a mounting bracket that is mounted to the underside of an engine block such that the face of the pickoff is maintained in spaced relationship to a sense wheel. The sense wheel contains a plurality of sense features and rotates with the engine crankshaft to coact with the pickoff to generate an output signal indicative of the motion of the crankshaft.

In addition, the phasing between the output signal and the engine motion is fixed by the pickoff mounting geometries and fixed by the orientation of the sense wheel relative to an index feature on the flange of the crankshaft.

Adjustment of this phasing relationship is accomplished by interposing calibrated spacers or shims between the bracket and an engine mounting surface.

23 Claims, 8 Drawing Figures

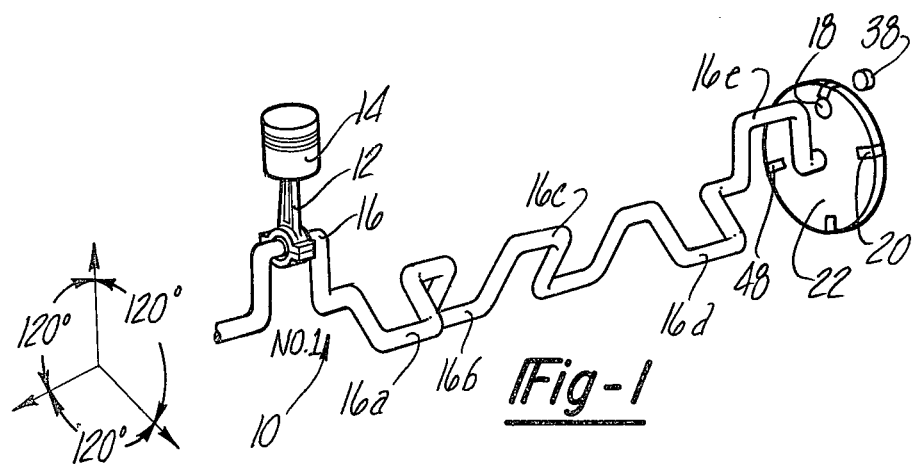
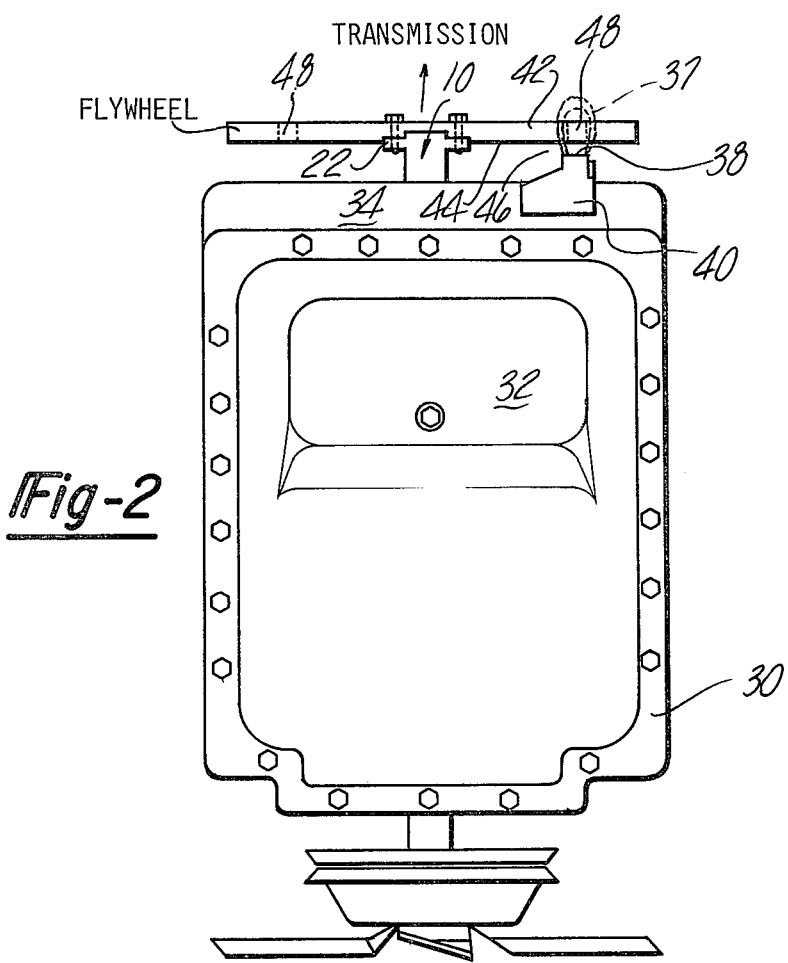

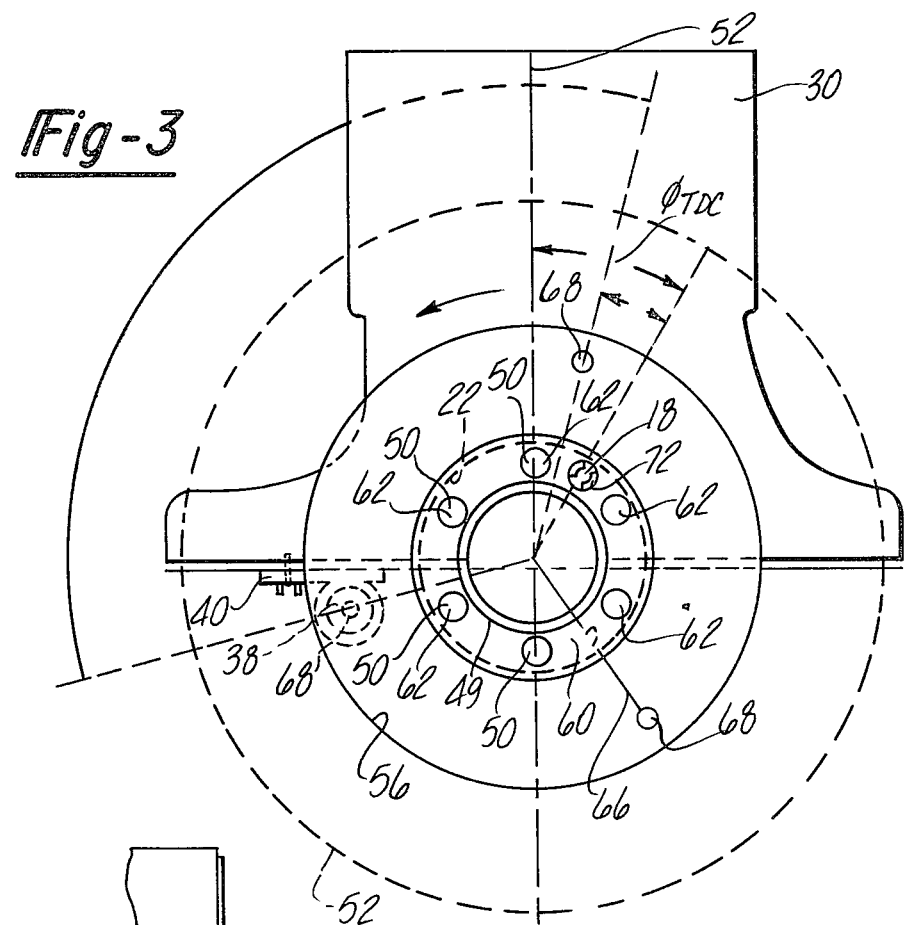
Fig-3
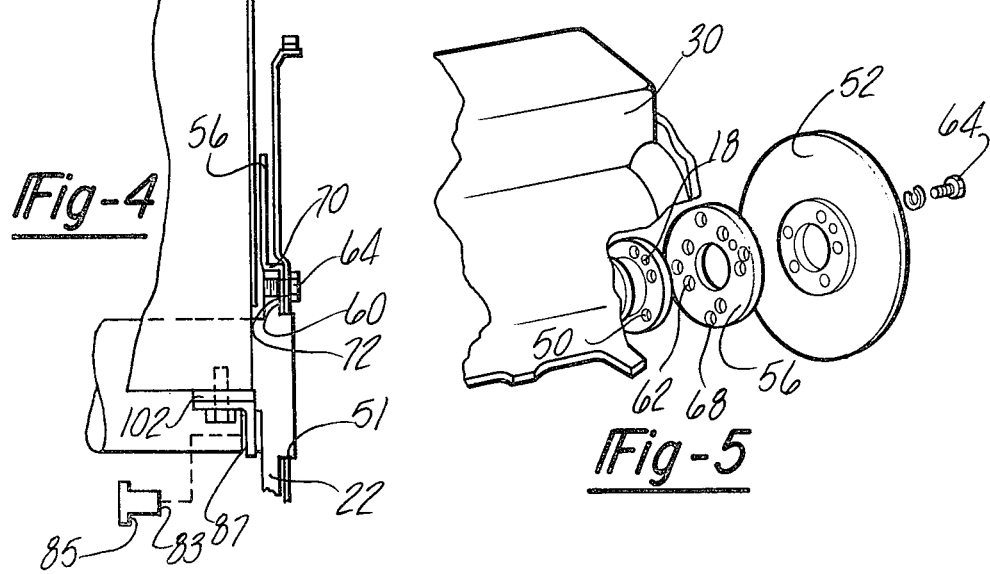
Fig-4
Fig-5

ADJUSTABLE ENGINE CRANKSHAFT POSITION SENSOR WITH PREADVANCE TIMING SIGNAL CAPABILITY AND METHOD OF VARYING ENGINE TIMING

BACKGROUND OF INVENTION

1. Field of Invention

The invention relates to crankshaft position sensing devices and methods of generating engine timing signals.

2. Description of the Prior Art

A crankshaft position responsive device is an essential element in any ignition timing system, engine cylinder firing system or synchronization system. In many engines, a distributor provides indirect crankshaft information such as engine speed and also distributes the spark to the proper cylinder at an instant when the piston of each cylinder is at a preferred position within its power cycle. Distributors are often driven through a worm gear by a camshaft which in turn is driven by an engine crankshaft. Significant problems do exist in present distributor systems. One source of error arises due to a stackup of tolerances (machining inaccuracies) between the crankshaft-worm gear-distributor cam making precise and repeatable engine synchronization difficult. Dynamic errors are especially evident during periods of acceleration and deceleration during which time imperfections in the gearing such as backlash become more apparent.

A second problem resulting in a constant position offset error arises because crankshaft position is not measured directly but is obtained by measuring the motion of intermediate elements such as a timing gear or vibration damper which can be misaligned relative to the crankshaft. Misalignment may result because of the imprecision in slots, or in keys and keyways that are used to position these intermediate members to the crankshaft.

To eliminate the buildup of mechanical errors due to gearing inaccuracies, systems have employed a sensor mounted proximate to the crankshaft at the front of engine. Such a sensor could be a reluctance sensing device responding to the passage of sense features such as protrusions or holes on a nearby sense wheel which is attached to the crankshaft vibration damper or timing gear A front mounted crankshaft sensor is susceptible to many sources of error. As an example, it must operate in a hostile exposed environment at the front of the engine. Furthermore, the front mounting, because of its easy accessibility, encourages user tampering. Permitting access to critical ignition components may give the user the opportunity to "fine tune" the performance of his vehicle; however, it is also possible for the user to circumvent the manufacturer's complex ignition timing synchronization which may be necessary to meet legislative standards for minimizing automotive exhaust emissions.

Due to the nature of the automotive market, it is desirable to produce a low cost crankshaft sensing and positioning device which is readily adaptable to most domestic and foreign engines. An advantage of the present invention is that it cooperates with existing engines and engine components so that integration of the crankshaft sensor into the engine is accomplished with a minimum of engine design changes.

It was determined that the rear of most engines are similar. In particular, the bottom rear of many cylinder blocks near the oil pan and within the transmission dust cover affords an accurately machined surface into which a crankshaft sensing element could be mounted with engine design changes, limited for the most part to making provision for sensor fastening holes in the bottom of the cylinder block and minor machining of the crankshaft flange, to the transmission dust cover and flywheel (or flex plate).

Improvements in engine performance such as fuel economy and emissions control require repeatable cycle-to-cycle crankshaft position and speed information. This is accomplished by the present invention. A further advantage of the present invention is that its output or timing signal is not effected by acceleration or deceleration of engine components or by mechanical wear.

It is an object of this invention to provide an improved crankshaft position sensor. It is a further object to accurately measure engine speed and to generate accurate spark timing information. Still a further object of this invention is to inhibit user tampering with the manufacturer specified engine timing while still affording a limited range of adjustability so that the basic ignition timing can be varied in order to compensate for ignition timing changes due to mechanical wear of engine components. It is a further object to monitor crankshaft position directly.

SUMMARY OF THE INVENTION

The present invention comprises an adjustable engine crankshaft position sensor; adjustable in the sense that it can generate an engine timing signal having a variable spacial relationship relative to the motion of moveable elements such as the pistons disposed with an engine block. The sensor produces signals which can later be processed to generate signals indicative of the rotational state (including the velocity and position) of the crankshaft. In this respect, the designation of the invention as a position sensor is somewhat of a misnomer because many signals can be derived therefrom; however, it is one that is typically used within the automotive arts. It should become apparent that signals such as crankshaft position, velocity, acceleration, etc., can be achieved by conventional signal processing of the sensor output. In addition, the present invention can be used to generate engine synchronization signals and to generate engine timing signals so that the combustion process within each cylinder of an engine may be ignited in synchronism with the reciprocating motion of the pistons of a conventional engine or other rotating member of a rotary engine relative to a predetermined point within the combustion cycle. In addition, the invention includes a method of synchronizing the motion of the pistons to the rotational motion of the crankshaft and sensor output.

The invention requires in part the generation of a signal path. The invention contemplates using a magnetic pickoff to generate a primary magnetic circuit, i.e., signal path; however, other signal path sources, such as a light source, may be substituted. A sensor wheel having a plurality of sense features thereon is mounted to and rotatable with the crankshaft of an engine. The sensor wheel and signal path generator are maintained in spaced relationship so that each sense feature may periodically interrupt the signal path thereby causing an output signal to be generated. In addition, the sense wheel is maintained in a preferred spacial relationship with respect to the combustion cycle so that the moment of interruption of the signal path is synchronized with the motion of the pistons, or peak power within the combustion cycle.

BRIEF DESCRIPTION OF THE DRAWINGS

FIG. 1 is a diagrammatic representation of an inline six cylinder crankshaft.

FIG. 2 is a view of the underside of an engine illustrating the mounting relationship.

FIG. 3 is an end view of an engine illustrating the mounting relationship between the sensing element and sense wheel.

FIG. 4 is a side view of the engine and sensor shown in FIG. 3.

FIG. 5 illustrates the engine-sensor wheelflywheel mounting relationship.

DETAILED DESCRIPTION OF THE DRAWINGS

Figure 6:
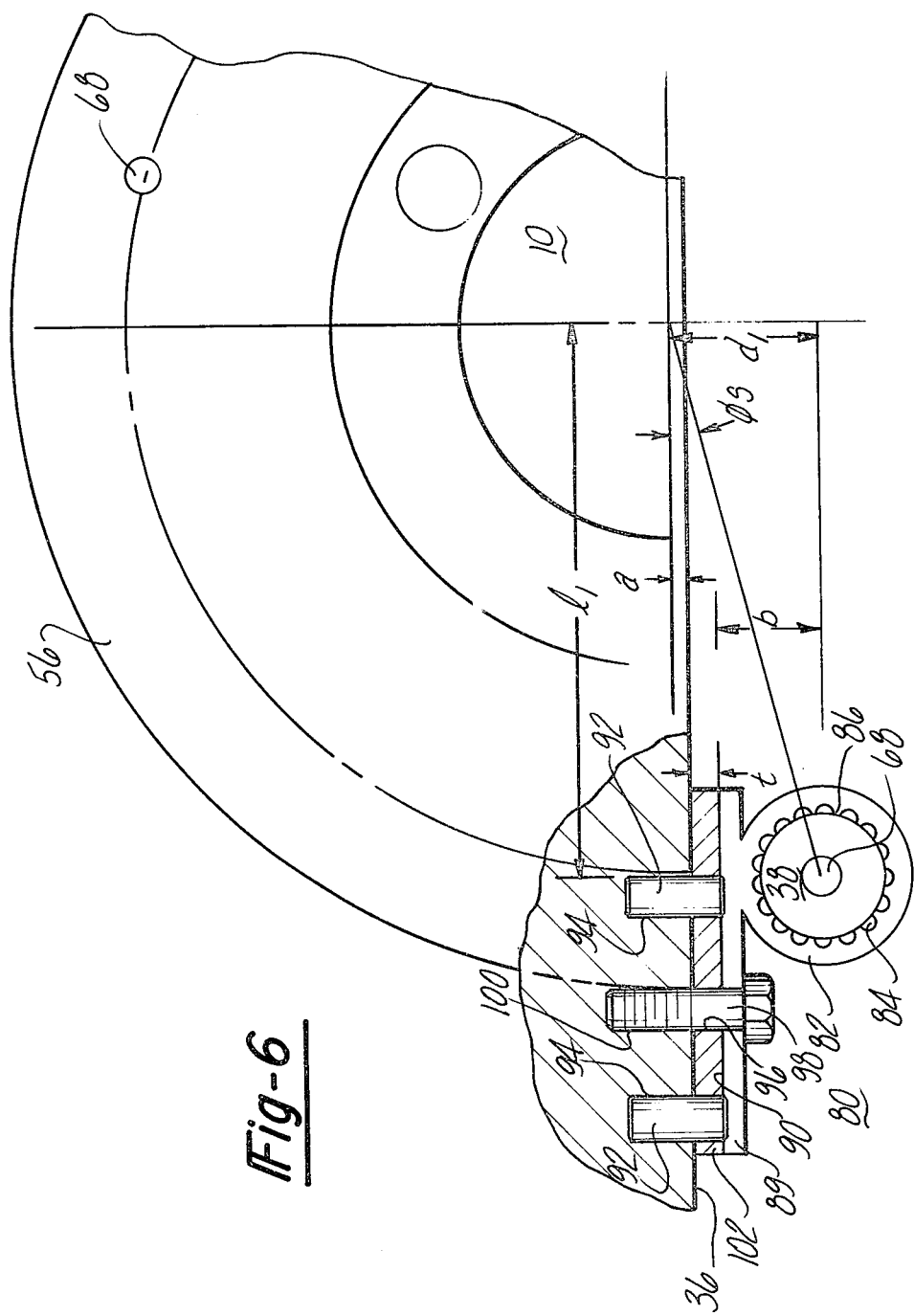
FIG. 6 is a fragmentary view showing the construction of the sensor bracket.

The invention permits accurate correlation between the reciprocating motion of an engine part such as a piston to the rotational motion of the crankshaft to generate accurate timing signals. Prior to discussing the specific embodiments of the invention, it is desirable to generally explore the function of an engine crankshaft. Consider FIG. 1 where there is shown a diagrammatic representation of a typical engine crankshaft 10. The crankshaft 10 shown is representative of a crankshaft used in an in-line six cylinder engine and is merely used as a convenient illustrative tool. It is understood that other crankshafts or rotating members of conventional or rotary engines may be substituted. A connecting rod 12 is shown linking the piston 14 of the No. 1 cylinder to the crankshaft 10. Typically, the connecting rod 12 joins a wrist pin of the piston 14 (not shown) to the throw 16 (sometimes referred to as the crank pin) of the crankshaft.

The throws for the other cylinder pistons are shown as 16a, 16b, 16c, 16d, and 16e.

The reciprocating motion of the pistons is converted to the rotational motion of the crankshaft 10 through the coaction of the pistons 14, throws 16 and connecting rods 12.

Crankshafts are typically fabricated from a steel casting or steel forging which is later machined to provide the necessary journals and throws. To achieve an efficient transformation of the reciprocating-to-rotational motion requires that the crankshaft be machined to very close tolerances. Metal work is often a multi-stage process requiring the workpiece, i.e., the crankshaft, to be machined at various work stations. To insure the accuracy of the final product, the rough cast crankshaft or forging is often costructed with an index feature such as a manufacturing hole 18 or slot 20. This index feature 18 or 20 provides a reference point for successive fabrication steps. It is significant to note that a determinable and unique relationship exists between the rotational position of the index feature 18 about the axis of rotation of crankshaft 10 relative to a stationary member such as the engine block (not shown in FIG. 1) and the orientation of each throw 16 and, consequently, between the motion of each piston 14. In other words, it is possible to use the knowledge of position of the index feature 18 on the flange 22 of the crankshaft to accurately infer the position of each piston 14 relative to a reference coordinate, such as TDC (top-dead-center) within its power cycle. The relationship between the rotation of the crankshaft and piston movement is further illustrated by briefly considering FIG. 3. FIG. 3 shows the crankshaft 10 of FIG. 1 disposed within an engine block. Consider the motion of the index feature 18. For example, when the index feature 18 is at a given angle $\phi_{TDC}$ such as 30° counterclockwise as measured from the vertical reference line 52, the throw 16 associated with the No. 1 piston and the piston 14, herein designated as an index piston, as well as the throw and No. 6 piston are in their respective top-dead-center (TDC) positions. This positional relationship will be further explored in conjunction with FIG. 8.

Suffice it to say that if a finished crankshaft does not contain an index feature 18 standard manufacturing and alignment practices would enable the user to accurately machine one into the crankshaft.

To produce an accurate measurement of crankshaft motion which is uneffected by mechanical wear or inaccuracies in intermediate members such as the camshaft or gears requires the directed measurement or sensing of the crankshaft motion. This can be achieved by requiring the crankshaft position sensor to be mounted to the engine in close proximity to the crankshaft 10. In addition, accuracy of measurement is further enhanced by shielding the crankshaft motion sensor from the hostile automotive road environment so that measurement errors are minimized due to environmental causes such as dirt, road tar, etc. In addition, the crankshaft motion sensor sould be easily integrated into all automotive engines requiring only minor modifications to the existing engine. This is no small requirement when considering the diverse sizes and designs of automotive engines.

Reference is now made to FIG. 2 where there is shown an underview of a typical engine block 30 with transmission dust cover removed having an oil pan 32 located thereon. The engine contains a centrally located crankshaft 10 that is partially disposed with the engine block 30. The crankshaft 10 contains a flange 22 onto which is mounted the transmission flywheel. An inspection of many engines reveals that an area of the engine block 30 between the oil pan 32 and the rear of the engine 34 contains an accurately machined surface which is in close proximity to the crankshaft. This surface can serve as a mounting surface 36 for receiving the signal path and output signal generating means, i.e., magnetic pickoff, of the present invention. In addition, it should be noted that this surface is generally isolated from the external environment since it is covered by the transmission dust cover (not shown).

FIG. 2 also discloses many of the elements of the present invention. In particular, it shows a sensing element 38, such as a reluctance sensitive magnetic pickoff, used to generate a signal path such as a primary magnetic circuit 37. The signal path comprises the sense element 38 and part of the local environment. The sense element 38 is disposed within a mounting bracket 40. The bracket 40 is in turn fastened to the mounting surface 36 so that the sensing element 38 is held parallel to a smooth sensing surface 44 of a sense wheel 42. The bracket 40 maintains the sense element 38 spaced apart from the sensing surface 44 establishing an air gap 46 therebetween. The sense wheel 42 of FIG. 2 contains a number of radially symmetric features 48 such as cylindrical holes having a spaced relationship relative to the sense element 38 and its associated signal path, i.e., the magnetic circuit 37, so that each sense feature 48 will periodically interrupt the primary magnetic circuit 37 as the sense wheel 42 rotates. Inspection of FIG. 2 will show that the sense wheel 42 is in fact the ferromagnetic flywheel of the transmission. The sense features intercepts the primary magnetic circuit 37 causing a change in the magnitude of flux flowing within the primary magnetic circuit thereby inducing an output signal from a coil (not shown) associated with the magnetic pickoff.

Figure 7:
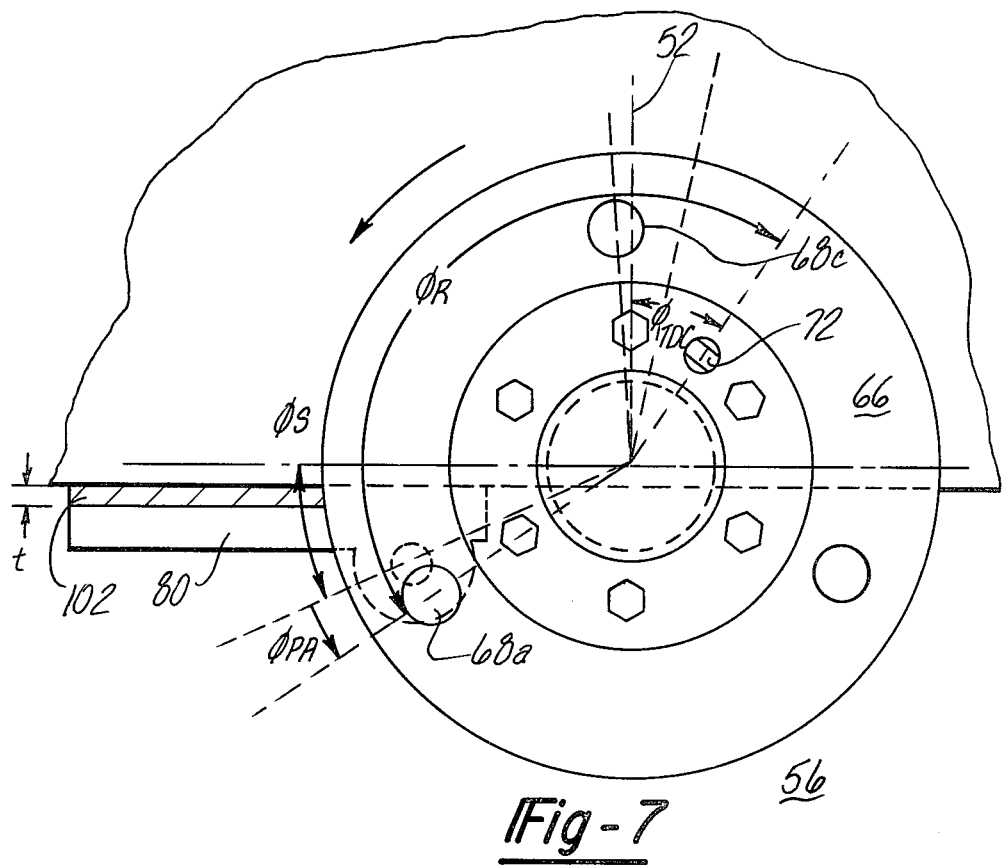
FIG. 7 illustrates the preferred orientation of the sense features on the sense wheel.

Instead of using a separate sense wheel 42 or the fly wheel the sense features 48 such as grooves, notches, holes and the like may be incorporated onto the flange 22 of the crankshaft as shown in FIG. 1. The sense features 48 would be machined onto the flange during the finish grinding of each throw therein insuring high accuracy and reduced cost in comparison with a system using a separate sense wheel or sense features on the flywheel. Obviously, the incorporation of sense features upon the flange 22 may necessitate using a larger flange 22 and/or require the sense element 38 to be mounted closer to the axis of the crankshaft 10 as shown in FIG. 2. The orientation of the grooves on the flange will be as shown in FIG. 7 which discusses a procedure for placing sense features on a separate sense wheel.

Referring now to FIGS. 3, 4 and 5, in particular, FIG. 3 shows a crankshaft 10 having a flange 22 containing a plurality of mounting holes 50. The crankshaft flange 22 shown has six spaced mounting holes 50. One skilled in the art will recognize that the number and relative location of these holes will vary from crankshaft to crankshaft. In addition, the crankshaft 10 contains a circular index feature 18 which is located on the crankshaft flange 22. It is recognized that other functionally equivalent features, such as slot 20, may be substituted.

Referring again to FIGS. 3 and 4, there is shown a sense wheel 56 mounted between the flywheel 52 and crankshaft flange 22. The sense wheel 56 is a ferromagnetic disk-like structure with a centrally located hole 48 having a diameter slightly larger than the central hub of the crankshaft 48 thereby permitting the sense wheel 56 to be slideably mounted to the crankshaft 10. Concentric to the central mounting hole 49 is a flat annular wheel mounting surface 60, which is sandwiched between the face of flange 22 and the flywheel 52. The sense wheel 56 further contains a radial array of mounting holes 62 similarly disposed about the mounting surface 60 as is the array of mounting holes 50 on the crankshaft flange 22 so that when the sense wheel 56 is in a preferred orientation relative to the crankshaft flange 22 both arrays of holes will have their centers coaxially aligned, thereby permitting the passage of suitable mounting bolts 64 (not shown in FIG. 3) from the flywheel through to the coacting screw threads of the crankshaft flange 22. Furthermore, the sense wheel contains an annular sensing surface 66 that is coaxial to and adjacent to the mounting surface 60. This surface 66 contains a number of sense features 68 such as holes, slots, indentations, protrusions, and the like, wherein as each sense feature passes within the proximity of the sense element 38, such as a magnetic pickoff will induce an output signal. The number of sense features (n) required is often determined to be one-half the number of operating cylinders within the engine. The angular displacement between the center of each sense feature is further determined by the relationship $\theta = 360°/n$. The center of each sense feature 68 is located within the sensing surface 66 at radial distance $r_1$, from the center of the axis of rotation of the crankshaft 10. The exact radial dimension is not critical, however, the radial distance $r_1$, must obviously be relatively equal to the distance between the center of the mounted sensing element 38, and the axis of rotation of the crankshaft. This spacial relationship will allow the passage of successive sense features 68 past the sensing element 38 as the sense wheel 56 rotates with the crankshaft 10. As illustrated in FIG. 3, the six-cylinder engine requires three sense features 68, each located 120 degrees apart. The relationship between these features 68 and the index feature 18 will be discussed later. The annular sensing surface 66 is connected to the annular mounting surface 60 by a transition surface 70. The transition surface 70 is shown at right angles to the mounting surface 60 and sensing surface 66 as shown in FIG. 4. However, other configurations may be substituted. It is only necessary that the transition surface 70, sensing surface 66 and sense element 38 cooperate so that the sense wheel 56 is sufficiently close to the face of sense element 38 to establish the spacing needed to achieve a primary magnetic circuit while maintaining the sensing surface 66 sufficiently apart from the flywheel 52 which is often ferromagnetic. Of course, the system design may be such as to include the flywheel within the primary magnetic circuit.

The preferred embodiment contemplates using a magnetic pickoff. The use of eletromagnetic devices as position or velocity sensors is well known. As an example, consider the transducer as recited by Palazzette in U.S. Pat. Nos. 3,944,025 or by Gee in 3,982,122, both of which are expressly incorporated by reference. These tubular transducers can be inserted into the holding member 82 of the bracket 40 of the present invention.

The present invention is obviously not limited to electromagnetic sense elements interacting with variable reluctance ferromagnetic sense wheels to create a primary magnetic circuit. It is apparent that a sense element can also generate an optical signal path which is interrupted by the sense features in a nearby sense wheel, and where passage of the sense features reflects the optical signal back to a photocell in the sense element or on the engine block. Alternatively, the system may contain an optical signal path generator comprising a light source and photocell disposed on either side of the sense wheels as taught by McEvoy, et al. in U.S. Pat. No. 3,562,741 the teachings of which are expressly incorporated by reference.

Referring again to FIG. 3, one should note that the sense wheel 56 has a positioning tab 72 located within the annular sense wheel mounting surface 60, which protrudes from the rear surface 74 of the sensing wheel 56 adapted to fit in and establish a press fit engagement with the index feature 18. During assembly, the sense wheel is fitted over the hub 51 of the crankshaft flange 22. The sense wheel 56 is then rotated about the hub 51 to align the positioning tab 72 with the index feature 18. The positioning tab 72 is then seated within the index feature 18 thereby establishing the preferred orientation of the sense wheel 56 to the crankshaft 10. The alignment of the tab 72 and index feature 18 will also establish the alignment each of the centers of the holes 62 to the centers of the holes 50.

In addition, the positioning tab 72 cooperates with the index feature 18 to establish a tangential, fit thereby preventing rotational motion of the sense wheel 56 relative to the crankshaft flange 22. The positioning tab 72 and index feature 18 thereby function as a means for obtaining proper alignment of the sense wheel 56 to the crankshaft 10. Other alternative methods of aligning the sense wheel 56 would be to use an asymmetric array of mounting holes or to replace the positioning tab with an interference fit pin inserted through the sense wheel 56 into the crankshaft flange 22.

FIG. 5 alteratively illustrates the functional relationship between the crankshaft 10, sense wheel 38 and flywheel.

To obtain synchronism or timing between the output signal, the motion of the sense features and the motion of the pistons disposed in the engine block and also to achieve the ability to change this synchronism or timing requiers 1) the controlled placement of the sense element 38 to the engine block, and 2) the controlled placement of the sense wheel 56 to the crankshaft 10.

Consider first the relationship of the sense element 38 and engine block 30. The component parts of the sense element bracket 80 can be seen in detail in FIGS. 6 and 7. The bracket 80 contains a holding member 82 with an internal bore 84 having a tapered intereference ribbing 86 which coacts with the outer surface of the sense element 38 establishing a force fit therebetween. The bore 84 permits the face 83 (FIG. 4) of sense element 38 to be maintained perpendicular to the central axis of the holding member 82. Alignment of sense element 38 to the holding member 82 can be aided by the seating of a flared shoulder 85, on the outer surface of the sense element 38, to a flat surface 87 of the member 82. It is envisioned that the sense element mounting bracket 80 would be fabricated from a die casting of zinc or aluminum while the outer surface of the sense element 38 would be fabricated from a harder material such as steel, thus permitting a force fit causing a slight deformation of the interference ribbing 86 caused by the insertion of te sense element 38. The holding member 82 is attached to a first mounting plate 89 to achieve proper orientation. The mounting plate 89 contains a flat mounting surface 90 wherein the plane of the mounting surface 90 is adapted to fit the engine block so as to maintain the central axis of the sense element 38 parallel to and spaced from the axis of rotation of the crankshaft 10 at a distance $r_1$. As illustrated in FIGS. 6 and 7, the plane of the mounting surface 90j is parallel to the central axisof the bore 84. A plurality of aligning pins 92 extend perpendicularly from the mounting surface 90. These aligning pins 92 fit into holes 94 machined into the mounting surface 36 at the rear bottom of engine cylinder block. The aligning holes 94 and plate 88 further aid to maintainthe central axis of the sense element parallel with the rotational axis of the crankshaft. In addition, the mounting plate 88 contains hole 96 through which a bolt 98 can be passed and screwed into a coacting threaded hole 100 within the engine block thereby securing the bracket 80 to engine mounting surface 36. One should also note as shown in FIG. 6 that a flat spacer 102 of thickness, t, is shown sandwiched between the mounting plate 88 and the engine mounting surface 36. The spacer 102 provides a means for varying the distance between the mounting surface 90 and the engine block. The spacer 102 can be manufactured from flat stock steel or plastic having a thickness (t) or machined to required dimensions. In any case, the spacer 102 will be adapted to permit the passage of the aligning pins 92 and fastening bolt 98 including having three holes dimensioned so that two fit through pins 92 while the third permits the passage of bolt 98.

In its mounted position, the central axis of the sense element 38 will be displaced from both the mounting surface 36 of the engine block and the axis of rotation of the crankshaft 10 as illustrated in FIGS. 6 and 7.

In general, the axis of rotation of the crankshaft will be displaced from the engine block mounting surface 36 by a distance (a). In addition, the distance between the central axis of the sense element 38 and the engine mounting surface 36 can be expressed as b+t.

It can also be seen that the central axis of the sense element will be at a distance $d_1$ from the crankshaft axis as measured perpendicularly to the enging mounting surface and that $d_1 = a+b+t$.

The sense element 38 of FIG. 6 is mounted to the engine block at a radial distance $r_1$ as measured from the axis rotation of the crankshaft to the central axis of the sense element 38. As shown, the sense element subtends a sensor angle $\phi_s$. The angle $\phi_s$ can be obtained from the following relationships:

$$\sin \phi_s = d_1/r_1 = (a+b+t)/r_1 \qquad (1) \text{ or}$$

$$\tan \phi_s = d_1/l_1 \qquad (2)$$

where $l_1{}^2 = r_1{}^2 - d_1{}^2$.

the knowledge of the above mentioned dimensions and geometries permits the controlled placement of the sense element to the engine block.

Consider next a method of achieving the controlled placement of the sense wheel 56 to the crankshaft 10. The placement process is illustrated with aid of FIG. 7. Consider the sense wheel 56 shown in FIG. 7 which contains a plurality of equally spaced circular sense features 68 spaced about the annular sensing surface 66 at a radial distance $r_1$.

The three sense features 68 correspond to those features required for an in-line six cylinder engine and are spaced 120 degrees apart. In addition, FIG. 7 illustrates that the common centers of the index feature 18 and the positioning tab 72 are oriented at an angle $\phi_{TDC}$ as measured in a clock-wise direction from a vertical reference line 52. The significance of the particular angle $\phi_{TDC}$ as previously mentioned is that when the index feature 18 is at this determinable orientation, the index piston is at the TDC of its power cycle.

Having oriented the sense element 38 to the engine block it is necessary now to orient the array of sense features 68 a, b, c upon the sensing surface, so that the center of one sense feature, such as sense feature 68a, is coincident with the central axis of the sense element 38 when the index piston is in its TDC position. This is accomplished by orienting sense feature 68a at a reference angle $\phi_R$ relative to the location of the index feature 18 when it is in its $\phi_{TDC}$ orientation. This procedure will enable the siganl path, i.e., magnetic circuit to be broken at the instance the index piston (as well as successive pistons) is at its respective TDC position.

Recalling that the mounted sense element 38 subtends an angle $\phi_s$ and that the index piston is at its TDC position when the index feature is at an angle $\phi_{TDC}$, it can be seen that if sense feature 68a is displaced from the sense feature 18 by a reference angle $\phi_R$, a correspondence will be achieved between the interruption of the signal path and the generation of an output signal and the TDC orientation of each piston. The angle $\phi_R$ can be expressed as:

$$\phi_R = \phi_S + TDC + 90° + \phi_{PA} \qquad (3)$$

and alternatively $$\phi_S = \text{constant} - \phi_{PA} \qquad (3a)$$

Having located one sense feature using the above relationship, the other sense features can be located along reference lines oriented at 360/n degrees relative to the location of sense feature 68a.

One skilled in the art should realize that the use of TDC as a reference indication is not a requirement but a convenient convention. Furthermore, in some applications or operating conditions, it may be preferable to generate a signal which is either advanced or retarded by an angle $\phi_{PA}$, which corresponds to a fixed timing preadvance or retardation angle relative to the TDC of piston motion. A typical $\phi_{PA}$ is shown in FIG. 7 and s shown for clarity purposes as an advance angle. It should be noted that if $\phi_{PA}$ is zero, the generated output signal will occur at an instant corresponding to TDC. Similarly, $\phi_{PA}$ can be a negative angle yielding signals information relative to a fixed point after top-dead-center. To achieve the advance or retard capability requires knowledge of the direction of rotation of the crankshaft and the reorientation of the array of sense features by an angle $\phi_{PA}$ relative to a reference line oriented at $\phi_R$ degrees relative to the index feature 18.

In practice the angle $\phi_{TDC}$ may be easily measured or supplied by the crankshaft or engine manufacturer while the magnitude of $\phi_{PA}$, the advance angle, would vary relative to the specific sensor and engine application. The magnitude of the sensor angle $\phi_S$ would be a fixed angle dependent, however, on the sensor mounting geometry and, in particular, the nominal thickness (t) of spacer 102.

Having achieved the desired preadvance angle, there should be virtually no reason to require changing this engine timing parameter. However, over the life of the engine and dut to such causes, such as a carbon buildup within the cylinders, or the manufacturer's tolerances have walked in a distance direction, it may be necessary to require a modification to the magnitude of the original engine timing preadvance angle $\phi_{PA}$. Referring to equation (3a), it can be seen that changes to the sensor angle $\phi_S$ will be relfected in changes in the magnitude of ignition preadvance or retard. In particular, in the embodiment shown in FIG. 7, as the sensor angle $\phi_S$ is reduced, the preadvance angle $\phi_{PA}$ will experience a corresponding increase due to the mounting relationship and direction of rotation of the crankshaft. Similarly, if the sensor angle is increased, the preadvance angle will decrese.

The present invention thereby permits a method of modifying the engine timing or preadvance angle. This is accomplished by varying the nominal thickness of the spacer 102 in accordance with the desired change in timing angle $\phi_{PA}$. For example, if it is desired to cause 1 degree reduction in the preadvance angle $\phi_{PA}$, the corresponding required change in $\phi_S$ will be an increase of approximately 1 degree. Recalling from equation (2) that the relationship between the nominal values of sensor angle $\phi_S$ and spacer thickness (t) are related by:

$$\tan \phi_S(\text{nom}) = (a + b + t_{nom})/l_1 \qquad (4)$$

A similar relationship exists relating a new sensor angle ($\phi_S(\text{new})$) to the new spacer thickness ($t_{nom} + t$) This relationship is:

$$\tan (\phi_S(\text{new})) = a + b + (t_{nom} + t)/l_1 \qquad (5)$$

Consequently, the required change t in spacer thickness to achieve the desired change in engine timing can be seen as:

$$t = l_1 \cdot \tan (\phi_S(\text{new})) - (a + b + t_{nom}) \qquad (6)$$

A modification in the phase angle relationship can then be achieved by using a single new spacer or combination of spacers to achieve the new required spacing and hence timing relationship.

Figure 8:
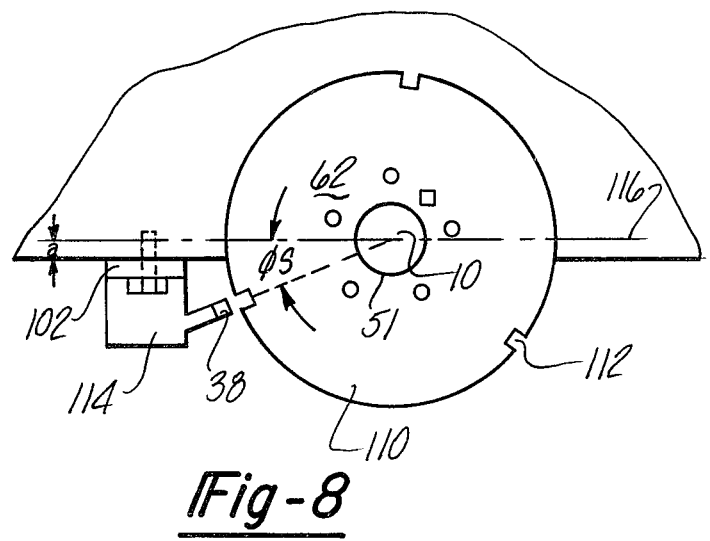
FIG. 8 illustrates an alternate embodiment showing a radially aligned sense element.

Reference is now made to FIG. 8 which illustrates an alternate embodiment of the present invention. A sense wheel 110 is mounted to and rotatable with the engine crankshaft 10. The sense wheel is a radially symmetric disk having an array of sense features 112 on its peripheral edge. The number of sense features 112, as before, is equal to one-half the number of cylinders within the engine. The sense wheel 110 shown in FIG. 8 contains three indentations 120 degrees apart indicating this arrangement is appropriate for an in-line six cylinder engine. Alternatively protrusions such as teeth on a spur gear could have been used. The sense wheel 110 also contains a central aperture permitting it to cooperate with hub 51 of the crankshaft flange, the sense wheel 110 also contains an array of mounting holes 62 through which fastening bolts can be passed, thereby securing the sense wheel to the crankshaft. A mounting bracket 114 has a shim spacer 102 interposed between the mounting bracket 114 and a mounting surface 36 cylinder block. The mounting bracket 114 cooperates with a sense element 38 and the sense wheel 110 so that the central axis of the sense element 24 is maintained initially along to a first radius oriented at an angle $\phi_S$ from a horizontal reference line 116 which intersects the center of the axis of rotation of the crankshaft 10. The sense feature 112 and bracket 114 cooperate so that the center of an index feature 112 is aligned with the central axis of the sense element 114, during a predetermined portion of the power cycle. Engine timing can be varied by changing the thickness of the shim 102.

Changes and modifications in the specifically described embodiments can be carried out without departing from the scope of the invention which is intended to be limited only by the scope of the appended claims.

What is claimed is:

1. A timing signal generator, adapted to be mounted to an engine, the engine having at least one combustion chamber with a first member moveably disposed therein and a second member, including a second member rotatably disposed within the engine, wherein the motion of said first member can be inferred from the motion of said second member, said timing signal generator comprising:

a signal path generator means for generating a signal path comprising:

a magnetic pickoff means, having a central axis, for generating a magnetic flux path along said central axis and adapted to fit within said means for receiving of a bracket so that its central axis is maintained co-linear to the central axis of said means for receiving, said magnetic pickoff further having an output coil for generating a signal in response to interruption in said magnetic flux path;

interrupter means, for interrupting said signal path in timed relationship with the motion of said first moveable member, including:

an index feature located on said second member;

a disk-like member having an array of apertures thereon wherein one of said apertures is designated as an index aperture and located on said disk-like member so that when said index feature is at a first determinable location relative to said engine said index aperture intercepts said signal path;

output signal generator means for generating an output signal in response to the interruption of said signal path;

bracket means adapted to be attached to the engine for holding said signal path generator means in a determinable orientation with respect to said interrupter means and including:

a structure having means for receiving said signal path generator means having a central axis therethrough and;

a mounting plate having on one side a mounting surface adapted to mate with said engine and further adapted on its other side to receive said structure so that the plane of said mounting surface has a determinable relationship to said central axis of said structure;

timing means for adjusting said timed relationship by varying the distance between said bracket means and said engine.

2. The signal generator as recited in claim 1 wherein said disk-like structure of said interrupter means is ferromagnetic.

3. The signal generator as recited in claim 2 wherein said interrupter means is a flywheel driven by said second member.

4. A timing signal generator adapted to be mounted to an engine, the engine having at least one combustion chamber with a first member moveably disposed therein, wherein the motion of the first member has a determinable relationship with respect to the combustion process within the combustion chamber, and the engine further contains a second member rotatably disposed within the engine such that the rotation of the second member is indicative of the motion of said first member, said timing signal generator comprising:

a signal path generator means for generating a signal path;

interrupter means for interrupting said signal path in timed relationship with the motion of said first member;

output signal generator means for generating an output signal indicative of the interruption of said signal path;

bracket means adapted to be attached to the engine for orienting said signal path generator means and for maintaining said signal path a determinable distance from the axis of rotation of said second member and including:

first means for maintaining said signal path in parallel relationship with the axis of rotation of said second member so that said signal path is initially maintained at vector distances $r_1$ and $d_1$ from the axis of rotation of said second member such that the distances $r_1$ and $d_1$ form the hypotenuse and opposite leg of a right triangle subtending a sensor angle $\phi_s$;

timing means for adjusting said timed relationship by varying said determinable distance.

5. The signal generator as recited in claim 4 wherein said timing means is a spacer disposed between said bracket means and said engine to calibratably change said sensor angle.

6. The signal generator as recited in claim 4 wherein said interrupter means comprises:

an index feature located on said second member wherein the motion of said first member is determinable from the motion of said index feature, in relation to said engine;

a disk-like member having an array of apertures, including at least one aperture designated as an index aperture, thereon and located on said disk-like member so that when said index feature is at a first determinable location relative to said engine said index aperture intercepts said signal path.

7. The system as recited in claim 6 wherein said first means of said bracket means further comprises:

a structure having a first and a second end and a central axis and inner surface coaxial to the central axis, wherein said inner surface includes a tapered interference ribbing extending from said first end to said second end so that the degree of taper increases as measured from said first end to said second end;

a mounting plate having on one side a planar mounting surface adapted to mate with said spacer means and further adapted on its other side to receive said structure so that the plane of said mounting surface has a determinable relationship to said central axis of said structure.

8. The signal generator as recited in claim 7 wherein said signal path generator comprises:

a magnetic pickoff means having a central axis for generating a magnetic flux path along said central axis and adapted to fit within said cylindrical inner surface of said bracket so that its central axis is maintained co-linear to the central axis of said cylindrical inner surface, said magnetic pickoff further having an output coil for generating a signal in response to interruptions in said magnetic flux path.

9. The signal generator as recited in claim 8 wherein said disk-like structure of said interrupter means is ferromagnetic.

10. The signal generator as recited in claim 9 wherein said interrupter means is a flywheel driven by said second member.

11. A timing signal generator in combination with an engine having a plurality of cylinders, each having one piston disposed therein wherein one piston, such as the No. 1 piston, is further designated as an index piston, the engine further having a crankshaft rotably disposed therein and including a crankshaft having an index feature thereon such that the reciprocating motion of the index piston can be inferred from the rotational motion of the index feature relative to the engine about the axis of rotation of the crankshaft, said timing signal generator comprising:

a signal path generator means for generating a signal path;

interrupter means located in spaced relationship to said signal path generator means for interrupting said signal path in timed relationship with the motion of said first member;

output signal generator means for generating an output signal indicative of the interruption of said signal path;

bracket means adapted to be attached to the engine for orienting said signal path generator means and for maintaining said signal path a determinable distance from the axis of rotation of said second member;

said bracket means containing:

first means for maintaining said signal path in parallel relationship with the axis of rotation of said second member so that said signal path is initially maintained at vector distances $r_1$ and $d_1$ from the axis of rotation of said second member such that the distances $r_1$ and $d_1$ form the hypotenuse and opposite leg of a right triangle subtending a sensor angle $\phi_s$.

timing means for adjusting said timed relationship by varying said determinable distance.

12. The signal generator as recited in claim 11 wherein said timing means is a spacer disposed between said bracket means and said engine to calibratably change said sensor angle.

13. The signal generator as recited in claim 12 wherein said interrupter means comprises:

an index feature located on said second member, wherein the motion of said first member is determinable from the motion of said index feature in relation to said engine;

a disk-like member having an array of apertures, said array comprising at least one aperture designated as an index aperture, though not greater than n/2 apertures placed at 360/n° apart wherein n is the number of combustion chambers within said engine, said array located on said disk-like member so that when said index feature is at a first determinable location relative to said engine said aperture intercepts said signal path.

14. The system as recited in claim 13 wherein said bracket means further comprises:

a structure having a first and a second end and a central axis and inner surface coaxial to the central axis, wherein said inner surface includes a tapered interference ribbing extending from said first end to said second end so that the degree of taper increases as measured from said first end to said second end;

a mounting plate having on one side a planar mounting surface adapted to mate with said spacer means and further adapted on its other side to receive said structure so that the plane of said mounting surface has a determinable relationship to said central axis of said structure.

15. The signal generator as recited in claim 14 wherein said signal path generator comprises:

a magnetic pickoff means having a central axis for generating a magnetic flux path along said central axis and adapted to fit within said cylindrical inner surface of said bracket so that its central axis is maintained co-linear to the central axis of said cylindrical inner surface, said magnetic pickoff further having an output coil for generating a signal in response to interruptions in said magnetic flux path.

16. The signal generator as recited in claim 15 wherein said disk-like structure of said interrupter means is ferromagnetic.

17. The signal generator as recited in claim 16 wherein said interrupter means is a flywheel driven by said second member.

18. The signal generator as recited in claim 11 wherein said interrupter means comprises an array of apertures including grooves, teeth, holes and the like, located in spaced relationship on a flange of said crankshaft.

19. A timing signal generator adapted to be mounted to an engine, the engine having at least one combustion chamber with a first member moveably disposed therein, wherein the motion of the first member has a determinable relationship with respect to the combustion process within the combustion chamber, and the engine further contains a second member rotatably disposed within the engine such that the rotation of the second member is indicative of the motion of said first member, said timing signal generator comprising:

a signal path generator means for generating a signal path;

interrupter means for interrupting said signal path in timed relationship with the motion of said first member;

output signal generator means for generating an output signal indicative of the interruption of said signal path;

bracket means adapted to be attached to the engine for orienting said signal path generator means and for maintaining said signal path a determinable distance from the axis of rotation of said second member and including:

first means for maintaining said signal path in intersecting relationship with the axis of rotation of said second member so that the extension of said signal path initially intersects said axis and wherein said signal path generating means is initially maintained at a radial distance $r_1$ from the axis of rotation of said second member and at a distance $d_1$ from said axis such that the distances $r_1$ and $d_1$ form the hypotenuse and opposite leg of a right triangle subtending a sensor angle $\phi s$;

timing means for adjusting said timed relationship by varying said determinable distance.

20. The signal generator as recited in claim 19 wherein said timing means includes means for varying the distance $d_1$.

21. A method of varying an ignition timing signal to vary the initiation of ignition of fuel within the combustion chambers of an internal combustion engine, the method comprising:

generating a signal path;

orienting said signal path in a determinable relationship relative to the axis of rotation of the crankshaft of the engine;

interrupting said signal path in timed relationship to the combustion process within each cylinder of the engine;

generating a timing signal in response to the interruption of said signal path; and adjusting the ignition timing signal by introducing mechanical advance or retard thereto by varying the distance between said signal path and the engine crankshaft.

22. The method as recited in claim 21 wherein the step of orienting further includes orienting said signal path so that said signal path is initially maintained at a radial distance $r_1$ from said axis of rotation and at a distance $d_1$ from the axis such that the distances $r_1$ and $d_1$ form the hypotenuse and opposite leg of a right triangle subtending an angle $\phi_s$.

23. The method as recited in claim 21 wherein the step of adjusting the ignition timing signal includes varying the distance $d_1$.

* * * * *